United States Patent [19]
Tiernan et al.

[11] Patent Number: 5,313,407
[45] Date of Patent: May 17, 1994

[54] INTEGRATED ACTIVE VIBRATION CANCELLATION AND MACHINE DIAGNOSTIC SYSTEM

[75] Inventors: Timothy A. Tiernan; Earl R. Geddes; Mark L. Mollon, all of Livonia, Mich.

[73] Assignee: Ford Motor Company, Dearborn, Mich.

[21] Appl. No.: 892,882

[22] Filed: Jun. 3, 1992

[51] Int. Cl.$^5$ .................. G06F 15/20; G06G 9/68
[52] U.S. Cl. ............................ 364/508; 364/507
[58] Field of Search ............. 364/508, 507, 424.04, 364/424.03; 381/71, 37; 73/116, 117.3; 318/114, 649; 188/378

[56] References Cited

U.S. PATENT DOCUMENTS

| | | | |
|---|---|---|---|
| 3,924,457 | 12/1975 | Oshima et al. | 73/116 |
| 3,965,677 | 6/1976 | Goto et al. | 60/277 |
| 4,083,234 | 4/1978 | Aono et al. | 73/116 |
| 4,473,906 | 9/1984 | Warnaka et al. | 381/71 |
| 4,483,425 | 11/1984 | Newman | 188/378 |
| 4,490,841 | 12/1984 | Chaplin et al. | 381/71 |
| 4,600,863 | 7/1986 | Chaplin et al. | 318/114 |
| 4,677,676 | 6/1987 | Eriksson | 381/71 |
| 4,819,182 | 4/1989 | King et al. | 364/508 |
| 5,012,174 | 4/1991 | Adkins et al. | 318/649 |
| 5,018,069 | 5/1991 | Pettigrew | 364/424.04 |
| 5,027,404 | 6/1991 | Taguchi | 381/37 |
| 5,041,974 | 8/1991 | Marko et al. | 364/424.03 |
| 5,042,162 | 8/1991 | Helms | 33/503 |
| 5,060,271 | 10/1991 | Geddes | 381/71 |
| 5,063,598 | 11/1991 | Geddes | 381/71 |
| 5,109,695 | 5/1992 | James et al. | 73/117.3 |
| 5,146,505 | 9/1992 | Pfaff et al. | 381/71 |

Primary Examiner—Thomas G. Black
Assistant Examiner—J. Harold Louis-Jacques
Attorney, Agent, or Firm—Mark Mollon; Roger L. May

[57] ABSTRACT

A machine analyzer is connected to an active vibration cancellation system in order to identify the operating status of the moving machinery while using a minimum of additional parts and taking advantage of signal processing already occurring in the active vibration cancellation system. A preferred embodiment employs a neural network pattern classifier in connection with detecting operating states such as cylinder misfires in an internal combustion engine.

21 Claims, 3 Drawing Sheets

| CLASSIFICATION | TRAINING VECTORS | |
|---|---|---|
| MISFIRE #1 CYL. | $V_{1,1}, V_{1,2}, \cdots V_{1,n}$ | |
| MISFIRE #2 CYL. | $V_{2,1}, V_{2,2}, \cdots V_{2,n}$ | ⟹ TRAINED CLASSIFIER WEIGHTS |
| ⋮ | | |
| MISFIRE #4 CYL. | $V_{m,1}, V_{m,2}, \cdots V_{m,k}$ | |

INTEGRATED ACTIVE VIBRATION CANCELLATION AND MACHINE DIAGNOSTIC SYSTEM

CROSS REFERENCE TO RELATED APPLICATION

This application is related to co-pending application Ser. No. 07/92,883 entitled "Misfire Detection in an Internal Combustion Engine Using Exhaust Pressure" which is filed concurrently herewith, now U.S. Pat. No. 5,193,513 issued Mar. 16, 1993.

BACKGROUND OF THE INVENTION

The present invention relates in general to active vibration control systems such as active noise cancellers and, more specifically, to monitoring the operating status of a machine for which undesired vibrations are being cancelled by an active control system.

Active vibration control (also called active noise control) is a technique wherein undesired noise or other vibrations in an area are reduced or eliminated by adding equal and opposite vibrations (counter-vibrations) into the same area. Thus, a pickup sensor converts the undesired vibrations into electrical signals which are applied to a digital computer for calculating the necessary counter-vibrations which will cancel the undesired vibrations. A signal representing the counter-vibrations is coupled to an actuator which applies vibrations to the area where cancellation is to occur. In the case of audible noise, the vibrations to be cancelled are vibrations in air which are sensed by a microphone and are cancelled by inverse noise created by a speaker.

Active vibration control can potentially be used to reduce or eliminate undesirable vibrations (either sound travelling in air or vibrations transmitted mechanically through solid structures) in a wide variety of applications. In the automotive field, such applications include engine exhaust noise, engine mounts, body mounts, vehicle suspension, interior noise, and others.

In many instances where an active vibration control system is employed, the undesired vibrations are created by a machine (i.e., a device having relatively moving parts creating the vibrations while doing work), such as an internal combustion engine, a fan, a pneumatic pump or other device. These machines are often complicated systems themselves, and in many cases it is desirable to monitor and automatically diagnose the operating status of the machine. For example, internal combustion engines in today's automobiles are very complicated machines employing monitoring of complex emission systems and various performance parameters. Certain fault conditions, such as cylinder misfires, must be diagnosed during engine operation to protect emissions systems components, such as a catalytic converter. Thus, co-pending application Ser. No. 07/892,883, now U.S. Pat. No. 5,193,513 misfire detection system using an exhaust pressure transducer and a pattern classifier such as a neural network to perform engine diagnosis.

Both active vibration cancellation systems and machine diagnostic systems can be relatively expensive since they often require specialized hardware and significant computing power.

SUMMARY OF THE INVENTION

The present invention has the advantage of reducing the cost and increasing the versatility of monitoring and diagnosing the status of a machine whenever an active vibration cancellation system is being employed to reduce or eliminate undesirable vibrations from the machine.

In one aspect of the invention, a method detects the status of a machine having relatively moving parts creating vibrations by performing the steps of 1) actively cancelling the vibrations with a transducer controlled by an adaptive controller, 2) sensing residual vibrations remaining after the active cancellation, 3) adapting the adaptive controller to reduce the residual vibrations and 4) comparing the adapted state of the adaptive controller with predetermined states to identify the status of the machine.

BRIEF DESCRIPTION OF THE DRAWINGS

The novel features of the invention are set forth with particularity in the appended claims. The invention itself, however, both as to its organization and method of operation together with further objects and advantages thereof, may best be understood by reference to the following description taken in conjunction with the accompanying drawings in which:

DETAILED DESCRIPTION OF PREFERRED EMBODIMENTS

Figures 1, 5:
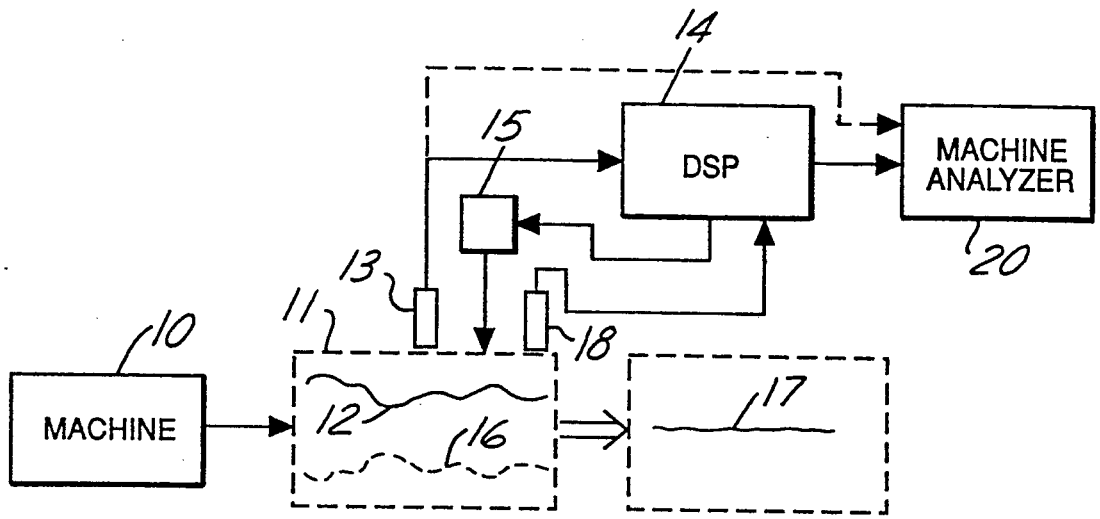
FIG. 1 is a block diagram of a first embodiment of the invention wherein an active vibration controller provides an input into a machine analyzer.
FIG. 5 illustrates lists of training vectors used for training the classifier of FIG. 4.

In FIG. 1, a machine 10 having relatively moving parts creating vibrations, introduces the vibrations into a media 11 such as a support structure for machine 10, the surrounding air, or air in a duct. A waveform 12 represents the machine vibrations introduced in media 11. An active vibration cancellation system includes a sensor 13, a digital signal processing (DSP) controller 14, and an actuator 15. Sensor 13 senses machine vibrations 12 and provides an electrical signal to DSP controller 14. The signals are digitally processed in DSP controller 14 to produce a counter-vibration signal which is provided to actuator 15. Counter-vibrations are produced by actuator 15 and coupled to media 11 where counter-vibrations 16 are added with machine vibrations 12 resulting in a reduced or eliminated vibration pattern 17 in media 11. As is known in the art, controller 14 is an adaptive controller wherein an adaptive filter has self-modifying characteristics to maximize the amount of vibration cancellation. Thus, the active cancellation system may require a second transducer 18 for sensing residual vibrations used in the adaption process.

The invention of FIG. 1 further includes a machine analyzer 20 which is connected to the active vibration cancellation system rather than directly to machine 10 as in the prior art. Machine analyzer 20 can be connected to sensor 13 and/or DSP controller 14 for collecting signals that are analyzed in a manner to identify the operating status of machine 10 based on the vibrations which it produces. The input signals employed by machine analyzer 20 (e.g., vibration signals coming from sensor 13, cancelling vibration signals going to actuator 15, and/or system values from DSP controller 14) and the manner of performing the analysis depend upon the operating states of machine 10 which are desired to be identified. Machine analyzer 20 can, for example, employ A) the measurement of input signal magnitudes and a comparison of measured values to predetermined ranges, B) a rule-based expert system analysis of measured values and calculated parameters, C) classification of input signals using a pattern classification system such as a neural network, or D) a combination of these. Input signals from sensor 13 are time-based signals which would be employed in machine analyzer 20 to identify those operating states of machine 10 which are most apparent in the time domain. Input signals from DSP controller 14, such as digital filter coefficients from an adaptive filter, contain frequency-based information which would be employed in machine analyzer 20 to identify machine states which are most apparent in the frequency domain. For an internal combustion engine, an example of a machine state most apparent in the time domain is the misfiring of a cylinder and an example of a machine state most apparent in the frequency domain is a cylinder operating under a lean fuel condition.

Figure 2:
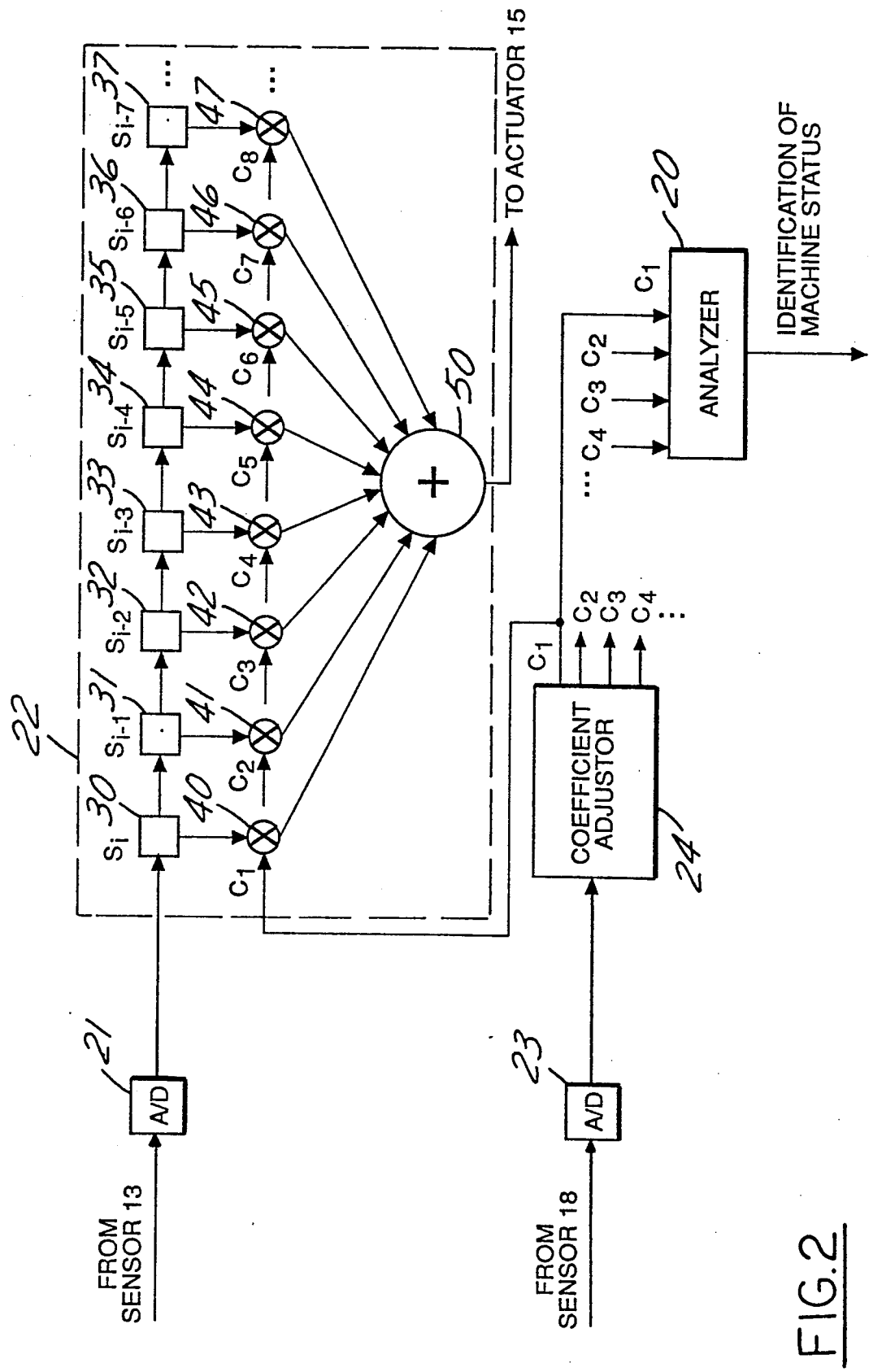
FIG. 2 is a schematic diagram showing an adaptive filter used in the embodiment of FIG. 1.

FIG. 2 shows DSP controller 14 in greater detail. An analog-to-digital converter 21 receives analog signals from sensor 13 and converts an analog signal into a digital signal which is provided to the input of a digital filter 22. In this embodiment, digital filter 22 is shown as a transversal filter having respectively delayed taps 30-37, each containing a respective sample $S_i$. A larger filter may be typically employed, but additional taps are not shown in order to simplify the drawing. Multipliers 40-47 are respectively connected to a respective tap 30-37 for receiving a respective sample $S_i$. Each multiplier 40-47 also receives a respective filter coefficient $C_1$ to $C_8$ which it multiplies by the respective sample. The outputs of multipliers 40-47 are coupled to a summer 50 which adds together all the multiplied samples to provide a filter output which is coupled to actuator 15, resulting in cancelling of the vibrations when the filter coefficients have correct values.

Digital filter 22 is shown as a finite impulse response (FIR) filter wherein samples from A/D converter 21 are serially shifted through taps 30-37 at the sample rate of A/D converter 21. However, other types of filters can also be used, such as an infinite impulse response (IIR) filter.

Digital filter 22 is adaptive by virtue of coefficients $C_1$ to $C_8$ being adjustable in a manner which maximizes the cancelling of the vibrations. Thus, the residual vibration signal from sensor 18 is coupled to an A/D converter 23. The digitized residual vibrations are coupled to a coefficient adjuster 24 which determines digital values for coefficients $C_1$ to $C_8$ using any of several known adaptive filter techniques such as a least mean square (LMS) technique.

The calculated coefficient values $C_1$ to $C_8$ are provided to multipliers 40-47 and also to analyzer 20.

When the active vibration cancellation system begins operation, coefficients $C_1$ to $C_8$ have arbitrary values (e.g., all zeros or all having pre-weight values determined in advance which may be close to the final values and reduce the time required to reach an adapted state) such that no cancellation is initially achieved. Coefficient adjuster 24 varies the coefficient values in a manner determined in accordance with the residual vibrations in order to improve the degree of cancellation. After a number of iterations, the coefficient values are adjusted to a point where cancellation of vibrations is substantially maximized. When this occurs, the system is "adapted". When the system is adapted, the digital filter coefficients contain information about the operation of the machine which is producing the vibrations that are being cancelled. In other words, the digital filter coefficients provide an indication of how hard the active vibration cancellation system must work in order to counteract the vibrations created by the machine. Thus, digital filter coefficients $C_1$ to $C_8$ are provided to analyzer 20 for comparison with coefficient values corresponding to predetermined adapted states of the DSP controller, as are determined in advance.

It should be noted that the coefficients $C_1$ to $C_8$ contain information concerning the operating status of the machine only to the extent that the DSP controller is operating as an acausal system; that is, the adaptive filter is adapting to the sound or vibrations themselves and not just to the vibration transmission characteristics of the vibratory media, such as a duct or machine support structure. For example, in an exhaust active noise cancellation system for an internal combustion engine, the adaptive controller is acausal at least at the low frequencies of concern. At higher frequencies, the system may be less acausal and use of the input sensor signal may be required for input into the analyzer. Alternatively, the output signal from the DSP controller to the actuator can be used instead of the input sensor signal.

Figure 3:
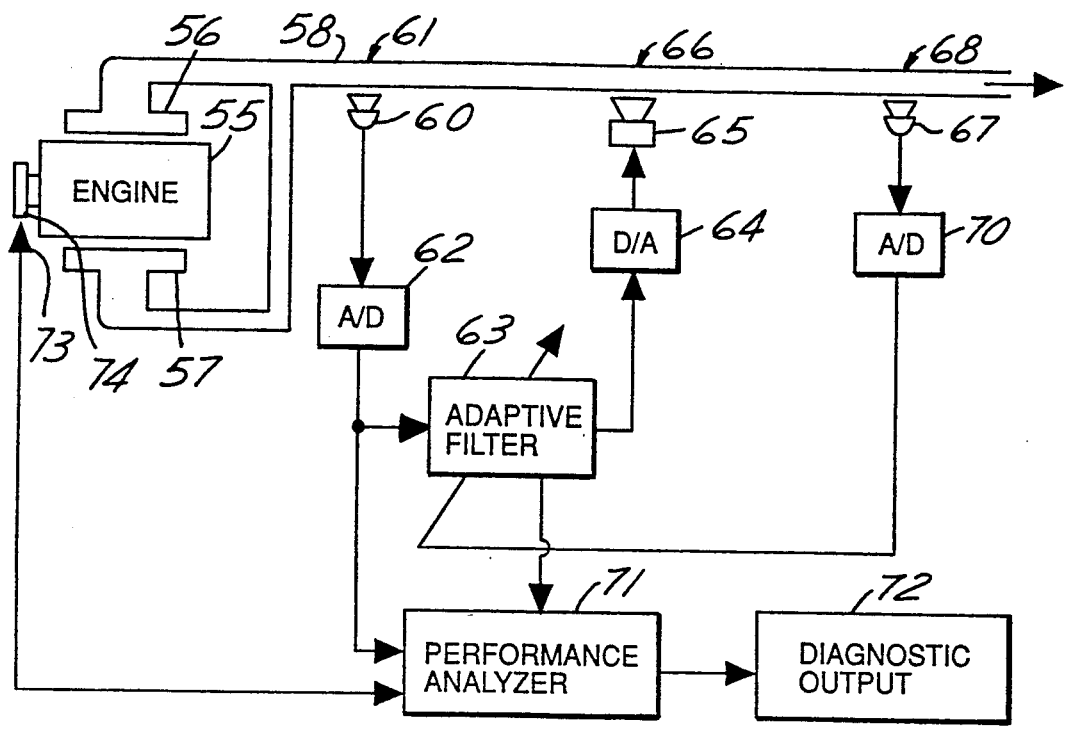
FIG. 3 is a block diagram showing an embodiment of the invention as applied to an internal combustion engine having an exhaust active noise control system.

FIG. 3 shows a preferred embodiment of the present invention in connection with an exhaust active noise control system (also commonly referred to as an electronic muffler system). An engine 55 has exhaust manifolds 56 and 57 feeding an exhaust duct or pipe 58. An input microphone 60 senses exhaust noise at a first location 61 in exhaust duct 58. An A/D converter 62 receives microphone signals at its input and provides digitized signals from its output to an adaptive filter 63. The filtered output from adaptive filter 63 is provided to the input of a D/A converter 64 which drives an output speaker 65 communicating with the exhaust duct 58 at a second location 66 downstream from first location 61. An error microphone 67 senses residual noise at a third location 68 which is downstream from second location 66. An A/D converter 70 digitizes error signals from microphone 67 and provides digital error signals to adaptive filter 63, thereby providing feedback which maximizes the cancellation obtained.

A performance analyzer 71 is connected to receive either A) digitized microphone signals from A/D converter 62, B) digital filter coefficient values from adaptive filter 63, or C) both, depending upon the engine operating states (i.e., faults) to be identified. Performance analyzer 71 may also receive information concerning other engine variables such as throttle position, engine load, or transmission gear selected, which other variables can be used in classifying the engine operating status. These other variables may be obtained using a communication link between performance analyzer 71 and an electronic engine control (EEC), not shown.

A diagnostic output 72 is connected to performance analyzer 71 for indicating to a vehicle operator or a service person the operating status or faults which are identified.

Examples of active cancellation systems of the type shown in FIG. 3 using adaptive filters are provided by Warnaka et al Pat. No. 4,473,906; Eriksson Pat. No. 4,677,676; Eriksson Pat. No. 4,677,677; Geddes Pat No. 5,060,271; and Geddes Pat. No. 5,063,598.

In order to identify specific cylinders within engine 55 which is causing an operating fault, engine position information is provided to performance analyzer 71 via a shaft position sensor 73 located in proximity with an engine shaft position mechanism 74 such as an encoder wheel mounted on the engine camshaft or crankshaft.

Performance analyzer 71 may, for example, implement an explicit algorithmic computer program to compare input signals from A/D converter 62 and/or coefficients from adaptive filter 63 with predetermined ranges to identify the operating status or occurrence of certain faults within engine 55. Alternatively, performance analyzer 71 may implement a rule-based expert system for identifying predetermined operating states of the engine. For example, an expert system may consider an input consisting of input data obtained during a full cycle of engine rotation to perform a frequency analysis of the input signal.

Figure 4:
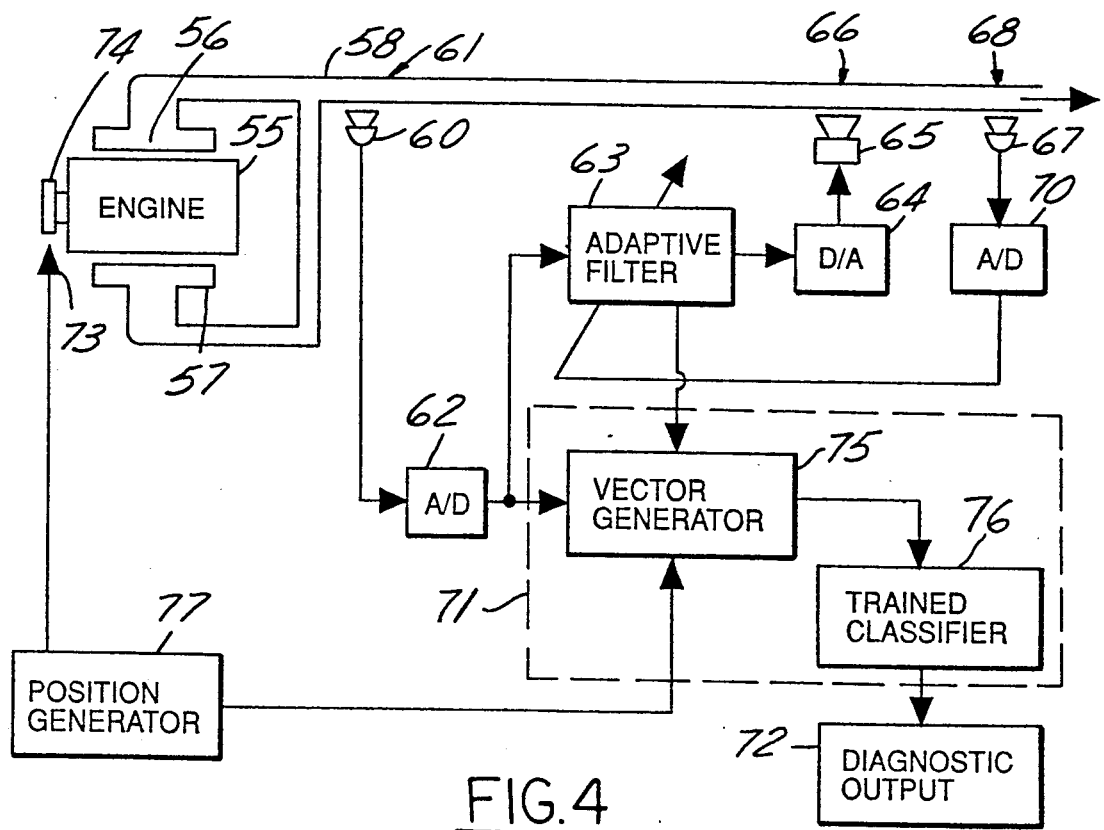
FIG. 4 is a schematic diagram of an alternate embodiment of an engine diagnostic and exhaust active noise control system.

FIG. 4 shows a further preferred embodiment of the invention employing a pattern classifier or neural network as a performance analyzer for an internal combustion engine. Thus, performance analyzer 71 is comprised of a vector generator 75 and a trained classifier 76. Vector generator 75 receives digital filter coefficient values from adaptive filter 63 and exhaust noise input samples from a A/D converter 62 used in forming vectors to be input to trained classifier 76 for classification according to predetermined diagnostic output values or states. In order to facilitate identification of engine states corresponding to individual cylinders of engine 55, a position generator 77 is provided connected to position sensor 73 in order to provide position information to vector generator 75. Position generator 77 may provide instantaneous engine position at predetermined times (e.g., when vector generator 75 is beginning the formation of a new vector) or may provide signals at predetermined reference positions of engine 55, depending on the desired form of vectors to be used in classifier 76.

The vectors to be classified by trained classifier 76 may be constructed according to either predetermined time segments or predetermined segments of engine rotation. However, vectors must be formed in the same way whether used in training the classifier or in classifying vectors during actual engine diagnosis.

Data included in a single vector may consist of three types: namely, 1) digital filter coefficients, preferably each coefficient being repeated a number of times at a sample rate $f_{s1}$ throughout the data frame, 2) a plurality of exhaust noise input samples at a sample rate $f_{s2}$, and/or 3) position data giving the position of the engine crankshaft (e.g., a value indicating the position of the engine crankshaft at the beginning of and/or during the data frame, and possibly including average engine speed during the data frame). Sample rates $f_{s1}$ and $f_{s2}$ may or may not be equal depending on the engine conditions being detected. Many engine conditions such as individual component failures (e.g., fuel injectors, spark plugs, etc.) do not change very often so that a sufficient sample rate for $f_{s1}$ to detect those conditions could be about one sample every 20 to 30 seconds. In order to detect other engine conditions, such as individual cylinder misfires, a higher sample rate would be required. For example, a typical digital filter for active exhaust noise cancellation may include about 28 filter taps which are updated about 2,000 times per second in an adaptive algorithm. A particular data sample is in the digital filter cycling through the filter taps for about $\frac{1}{8}$ seconds. Thus, a sample rate of 10 times per second would be sufficient to detect individual cylinder misfires. Sample rate $f_{s2}$ needs to be sufficient to characterize the frequency of interest in the exhaust noise. The position data can be inherent in other terms in the vector if the data frame for collecting the vector is keyed from predetermined reference positions of the engine crankshaft. The digital filter coefficient terms of a vector may be comprised of an average of several consecutive coefficient values for each respective coefficient in order to reduce the sample rate.

In the preferred embodiment, trained classifier 76 includes neural network weights which are determined in advance in accordance with the defined form of vectors from vector generator 75 and the operating states or conditions which are to be identified in engine 55. Thus, the neural network weights are determined in advance using a test system identical to the system shown in FIG. 4 wherein a trainable classifier is employed. An input label identifies each respective predetermined condition present in the engine operating status during collection of each training or test vector. Thus, a test engine identical to engine 55 is bugged with predetermined conditions to create predetermined engine states to be detected (such as cylinder misfires, lean fuel conditions, etc.). The bugged engine is then operated under a full range of engine conditions, such as speed and load and other factors affecting the transmission of vibrations. A training vector corresponding to each different condition of the bugged engine is formed and all the training vectors are compiled into a data base for performing training of the classifier. This procedure is repeated for additional bugs corresponding to the engine states to be detected. Each training vector is labeled with a bug identifier to identify which condition was present during collection of the training vector (e.g., which cylinder was misfiring in the training vector).

FIG. 5 illustrates collection of training vectors wherein an engine is bugged in order to create a misfire in cylinder No. 1, and a plurality of vectors $V_{1,l}$ to $V_{1,n}$ are collected at various operating conditions of engine speed, load, and temperature, for example. Likewise, a plurality of training vectors are collected with cylinder 2 misfiring to produce training vectors $V_{2,l}$ to $V_{2,n}$. The engine is bugged to create a lean fuel condition in cylinder No. 4, and a plurality of input vectors designated as $V_{m,1}$ to $V_{m,k}$ are collected. In FIG. 5, n, m and k represent integers having a value sufficient to characterize engine operation. All of the training vectors and their corresponding labels (e.g., classification values) are input into a trainable cLassifier in order to produce trained classifier weights. These final trained classifier weights are then transferred into a trained classifier 76 for purposes of engine diagnosis during in-use engine operation.

As described above, the present invention has the ability to analyze the status of any machine creating vibrations. Examples of such systems other than internal combustion engines include fans in air handling systems, turbines used in power generation, and various machine tools.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A method for detecting a status of a machine having relatively moving parts wherein operation of said machine creates vibrations, said method comprising the steps of:
    actively cancelling said vibrations with a transducer controlled by an adaptive controller;
    sensing residual vibrations remaining after said active cancellation;
    adapting said adaptive controller in response to said residual vibrations; and
    comparing the adapted state of said adaptive controller with predetermined states to classify said status.

2. Apparatus comprising:
    a machine having relatively moving parts wherein operation of said machine creates vibrations;
    transducer means for combining counter-vibrations with said vibrations;
    sensor means for sensing residual vibrations remaining after said combination of vibrations and counter-vibrations;
    controller means coupled to said transducer and said sensor means for actuating said transducer and adapting to a controller state which minimizes said residual vibrations; and
    comparing means for comparing said adapted controller state with predetermined states to classify a corresponding operating status of said machine.

3. The apparatus of claim 2 wherein said predetermined states include states corresponding to malfunctions of said machine.

4. The apparatus of claim 2 wherein said comparing means further compares said adapted controller state with predetermined states to identify a corresponding operating status of said transducer means.

5. The apparatus of claim 2 wherein said machine is comprised of an internal combustion engine and wherein said vibrations are comprised of exhaust noise.

6. The apparatus of claim 5 wherein said predetermined states include states corresponding to malfunctions of said internal combustion engine.

7. An integrated vehicle system for actively cancelling exhaust noise in an exhaust conduit of an engine and for analyzing performance of said engine, comprising:
    a cancellation system including:
        input transducer means for producing an input signal proportional to a sound pressure wave at a first location in said conduit;
        output transducer means for producing a cancelling pressure wave at a second location in said conduit in response to an output signal, said first location being between said second location and said engine;
        error transducer means for producing an error signal proportional to a sound pressure wave at a third location in said conduit, said second location being between said first and third locations; and
        adaptive filter means responsive to said input signal and said error signal for producing said output signal, said adaptive filter means including a plurality of digital filter coefficients having digital values determined in response to said error signal; and
    performance monitor means coupled to said cancellation system to classify a performance parameter of said engine in response to at least one signal from said cancellation system.

8. The system of claim 7 wherein said performance monitor means is coupled to receive said input signal from said input transducer means.

9. The system of claim 7 wherein said performance monitor means is coupled to receive said digital filter coefficients from said adaptive filter means.

10. The system of claim 9 wherein said digital filter coefficients are periodically sampled.

11. The system of claim 7 wherein said performance monitor means is coupled to receive said input signal from said input transducer means and is coupled to receive said digital filter coefficients from said adaptive filter means.

12. The system of claim 7 wherein said performance monitor means is comprised of a trained pattern classifier.

13. The system of claim 7 wherein said performance monitor means is comprised of a model-based signal analyzer.

14. The system of claim 7 further comprising:
    diagnostic indicator means coupled to said performance monitor means for visually indicating the status of said predetermined performance parameter.

15. The system of claim 7 further comprising:
    engine position means for producing a position signal identifying predetermined rotational positions of said engine;
    wherein said performance monitor means is coupled to receive said position signal and wherein said predetermined performance parameter is an individual engine-cylinder parameter.

16. The system of claim 7 wherein said predetermined performance parameter is cylinder misfire.

17. A method for analyzing performance of a combustion engine, said engine having an exhaust conduit and an active exhaust noise cancellation system coupled to said exhaust conduit, said cancellation system including an adaptive filter implemented with digital filter coefficients, said method comprising the steps of:
    sensing an input sound pressure wave at a first location in said exhaust conduit;
    determining a cancelling wave with said adaptive filter which is inverse to said input sound pressure wave;
    injecting said cancelling wave into said exhaust conduit at a second location displaced from said first location in the direction of exhaust flow;
    sensing an error sound pressure wave at a third location displaced from said second location in the direction of exhaust flow;
    adapting said adaptive filter by modifying said digital filter coefficients to minimize said error sound pressure wave; and
    processing said digital filter coefficients to classify said engine performance.

18. The method of claim 17 wherein said processing step is comprised of:

forming an input vector comprising said digital filter coefficients; and classifying said input vector as satisfying at least one predefined engine performance criteria using a trained pattern classifier.

19. The method of claim 18 wherein said input vector further includes engine position data.

20. The method of claim 18 wherein said input vector further includes input sound pressure wave data.

21. The method of claim 17 wherein said processing step is comprised of:

analyzing said digital filter coefficients according to an expert system model.

* * * * *